(12) United States Patent
Park et al.

(10) Patent No.: US 7,058,612 B2
(45) Date of Patent: Jun. 6, 2006

(54) SYSTEM AND METHOD FOR PRODUCING AND VERIFYING SECURE NEGOTIABLE INSTRUMENTS

(75) Inventors: Gregory Ernest Park, Stratham, NH (US); Timothy P O'Hagan, Dover, NH (US)

(73) Assignee: Bottomline Technologies, (DE) Inc., Portsmouth, NH (US)

( * ) Notice: Subject to any disclaimer, the term of this patent is extended or adjusted under 35 U.S.C. 154(b) by 674 days.

(21) Appl. No.: 10/190,060

(22) Filed: Jul. 3, 2002

(65) Prior Publication Data

US 2003/0225705 A1 Dec. 4, 2003

Related U.S. Application Data

(63) Continuation-in-part of application No. 10/162,292, filed on Jun. 4, 2002.

(51) Int. Cl.
*G06F 17/64* (2006.01)

(52) U.S. Cl. .............................. 705/64; 705/1; 380/54; 713/176; 713/168

(58) Field of Classification Search .................... 705/1, 705/64; 380/54; 713/176, 168
See application file for complete search history.

(56) References Cited

U.S. PATENT DOCUMENTS

| 4,321,672 A | 3/1982 | Braun et al. |
|---|---|---|
| 5,594,225 A | 1/1997 | Botvin |
| 6,058,380 A | 5/2000 | Anderson et al. |
| 6,073,121 A | 6/2000 | Ramzy |
| 6,164,528 A | 12/2000 | Hills et al. |
| 6,170,744 B1 * | 1/2001 | Lee et al. .................... 235/380 |
| 6,181,814 B1 | 1/2001 | Carney |
| 6,233,340 B1 | 5/2001 | Sandru |
| 6,600,823 B1 * | 7/2003 | Hayosh ........................ 380/51 |
| 6,820,815 B1 * | 11/2004 | Meunier et al. ............ 235/487 |
| 6,834,794 B1 * | 12/2004 | Dabrowski ................... 235/375 |
| 2002/0174074 A1 * | 11/2002 | Meadow et al. .............. 705/71 |

FOREIGN PATENT DOCUMENTS

WO        WO 9847264       * 10/1998

OTHER PUBLICATIONS

Automatic storage, retrieval and visualization of bank check images; Koerich (date unknown).*
David Messerschmitt RSA Asymetric Encryption.

* cited by examiner

*Primary Examiner*—James P. Trammell
*Assistant Examiner*—John Winter
(74) *Attorney, Agent, or Firm*—Timothy P. OHagan

(57) ABSTRACT

The present invention relates to producing and presenting negotiable instruments and, more specifically, to printing and presenting checks, which are resistant to forgery or fraud. The negotiable instrument comprises a numeric sequence printed in MICR font upside down across the top face of the negotiable instrument for electronic reading by a MICR reader. The numeric sequence provides for authentication of the payee name and the payment amount by a secure authentication server.

11 Claims, 13 Drawing Sheets

‎⑆0201‎⁜‎2067‎⁜⁜⁜ ‎71E‎⁜⁜⁜ ‎026‎⁜

9032

ABC Company Incorporated
12345 Street Address
City, State Postal Code

Date _January 1, 2010_

Pay to the
Order of ___Payee Company___    $ | 2,365.50 |

_Two-Thousand Three-Hundred Sixty-Five and Fifty Cents_ _____ DOLLARS

XYZ First Federal Bank

MEMO ___Invoice #3456___

⑆⑉···⑈⑉⑆                                         ─┬─ 52
                                       Date  January 1, 2010
ABC Company Incorporated
12345 Street Address
City, State Postal Code Pay to the
Order of   Payee Company                      $  2,365.50
           Two-Thousand Three-Hundred Sixty-Five and Fifty Cents  DOLLARS  ─┬─ 54
XYZ First Federal Bank MEMO  Invoice #3456
⑆⑈⑆⑆⑉⑈⑆⑉ ⑆ ⑆⑈⑆⑉⑈⑉⑆⑆ ⑈ ⑆⑉⑆⑉ ⑈⑈
```

ABC Company Incorporated
12345 Street Address
City, State Postal Code                       32c
                                                Date  January 1, 2010
Pay to the
Order of    Payee Company                      $  2,365.50             52

Two-Thousand Three-Hundred Sixty-Five and Fifty Cents  DOLLARS
XYZ First Federal Bank                                                  54

MEMO    Invoice #3456
  ⑈:3467932⑈:  ⑈:30128⑈⑈       9032⑈
42 ⑂  46 ⑂  53 ⑂  48 ⑂  34 ⑂           36      38        40
```

Figure 2c

| ASCII Characters | Limited Characters | Binary Value |
|---|---|---|
| 0 | 0 | 000000 |
| 1 | 1 | 000001 |
| 2 | 2 | 000010 |
| 3 | 3 | 000011 |
| 4 | 4 | 000100 |
| 5 | 5 | • |
| 6 | 6 | • |
| 7 | 7 | • |
| 8 | 8 | |
| 9 | 9 | |
| A or a | A | |
| B or b | B | |
| C or c | C | |
| • | • | |
| • | • | |
| • | • | |
| X or x | X | |
| Y or y | Y | |
| Z or z | Z | |
| Period | Period | |
| Comma | Comma | |
| Space | Space | |
| All Others | <Underscore> | |

Figure 6

| Authentication Log 202 | | |
|---|---|---|
| Check Number | Payee 206 | Amount 208 |
| 103 | XXXXX | $ XXXX |
| 107 | XXXXX | $ XXXX |
| 102 | XXXXX | $ XXXX |
| 101 | XXXXX | $ XXXX |

| Check Log 192 | | | |
|---|---|---|---|
| Check Number | Payee 196 | Amount 198 | Authenticated 200 |
| 101 | XXXXX | $ XXXX | Yes |
| 102 | XXXXXX | $ XXXX | No |
| 103 | | | No |
| ⋮ | | | ⋮ |
| XXXXX | | | Yes / No |

| Check Issuer ID | Routing # 214 | Account # 216 | Authentication Server URL 218 |
|---|---|---|---|
| 101 | XXXXX | XXXXX | XXXXX |
| 102 | XXXXX | XXXXX | XXXXX |
| 103 | | | |
| ⋮ | | | |
| XXXXX | | | |

210

212

SYSTEM AND METHOD FOR PRODUCING AND VERIFYING SECURE NEGOTIABLE INSTRUMENTS

TECHNICAL FIELD

The present invention relates to producing and presenting negotiable instruments and, more specifically, to printing and presenting checks, which are resistant to forgery or fraud, due to the manner in which they are printed, the composition of the printed checks, and/or the codes used in connection with them.

BACKGROUND OF THE INVENTION

In the modern economy, monetary disbursements are often accomplished by the payor issuing a negotiable instrument, or check, to the payee. The advantages check disbursement systems are well-known. However, checks are subject to fraud, and check fraud is becoming more wide spread as access to more advanced graphic color printing equipment, image scanning equipment and/or photocopying equipment becomes more wide spread. Such equipment can easily duplicate or counterfeit many known negotiable instrument anti-fraud systems that are based either printing the negotiable instrument on secure stock with a "printed watermark" or printing the negotiable instrument with a secure font that may include unusual character shapes, sizes, and or colorings that are not typically available to other than the payer.

Using such equipment, it is common for a dishonest payee to use such equipment to increase the amount of a check and/or to duplicate a check several times to fraudulently obtain money. It is also common for a third party to obtain a check and alter the name of the payee (and possibly increase the amount and/or duplicate a check) to fraudulently obtain money.

Without the use of positive payment systems, such fraud may not be discovered until the payor receives its account statement (or a notice that the account is overdrawn) and discoveres payment on checks that were not actually issued. With the use of positive payment systems, the fraud can be detected when the bank holding the payor's checking account begins receiving checks that to not match the list of checks issued by the payor (e.g. the positive payment file delivered to the bank by the payor that lists at the amount, and check number of each check issued by the payee). At least two problems with use of positive pay systems are: 1) the positive pay file can be used to verify the amount of a check and prevent payment of duplicated checks with the same check number, but does not provide any verification that the name of the payee has not been altered; and 2) by the time the bank compares the check to the positive payment file and detects the fraud, it is likely that the person who created the fraudulent check has already received at least a portion of the payment amount in cash and can no longer be located for recourse.

A known attempt to reduce fraud involves computing a check digit based on check information and printing the check digit on the check or delivering the check digit to the bank holding the account on which the check is drawn as part of the positive payment file. When the check is presented, the bank could recomputed the check digit (using the same check digit computation function) with the information on the face of the check and compare the computed check digit with that printed on the face of the check. If there is a discrepancy between the computed check digit and the check digit printed on the face of the check, the bank would be alerted to the forgery and not accept the check. The problem with such system, similar to that of the positive pay file system, is that by the time the fraud is detected and the check dishonored, it is likely that the person who created the fraudulent check has already received at least a portion of the payment amount in cash and can no longer be located for recourse.

Similar systems have been proposed wherein a facility first accepting the check upon presentation could recompute the check digit (or other encrypted control code) using the information on the face of the check. Again, if the computed check digit or control code does not match that printed on the face of the check, the facility would be alerted to the potential fraud and not accept the check. The problem with such a system is that each facility to which the check could first be presented would need to have access to the algorithm for calculating the check digit or control code. Such wide spread dissemination of the algorithm would for compromise its security and a sophisticated forger could simply use the algorithm to reproduce check digit or code on the face of the forged check that matches the forged check information thereby defeating both systems.

Yet another enhancement to such a system would involve encoding the check information into a machine readable code on the face of the check for reading and decoding by the facility. However, again, the wide spread dissemination of the equipment and algorithm for decoding the check would for compromise its security and a sophisticated forger could simply use the algorithm to reproduce a machine readable code on the face of the forged check that matches the forged check information thereby defeating the system.

Thus, there continues to exist a need to improve negotiable instrument security that does not suffer the disadvantages of known systems.

SUMMARY OF THE INVENTION

A first aspect of the present invention is to provide a system for printing a negotiable instrument in accordance with payment instructions, the payment instructions comprising at least a payee name and a payment amount. The system comprises a module for calculating a numeric sequence, the module selected from a group of modules consisting of: i) a hash module for calculating the numeric sequence by operating a hash function on at least a portion of the payee name and the payment amount; ii) an encryption module for calculating the numeric sequence by operating an encryption function on at least a portion of the payee name and the payment amount; and iii) a compression module for calculating the numeric sequence by operating a compression function on at least a portion of the payee name and the payment amount. The system further comprises a payment module for generating an image file, the image file comprising: i) a recognizable alpha numeric representation of the payee name within a payee field; ii) a recognizable numeric representation of the payment amount within a numerical amount field; iii) a recognizable alpha numeric representation of the payment amount within an alpha numeric amount field; iv) a MICR representation of a routing number and an account number within a first MICR zone across the bottom of the negotiable instrument; and v) a MICR representation of the numeric sequence within a second MICR zone across the top of the negotiable instrument, the MICR representation in the second MICR zone being in an inverted relationship to the MICR representation in the first MICR zone.

In an embodiment wherein the module is a hash module for calculating the numeric sequence by operating a hash function on at least a portion of the payee name and the payment amount, the numeric sequence comprises a hash number representing the result of operating the hash function on a truncated portion of the payee name and the payment amount.

The module may further calculate a compressed number representing the result of operating a compression function on the truncated portion of the payee name and the payment amount and the numeric sequence comprises the hash number and the compressed number. The truncated portion of the payee name may consist of a limited character set payee name resulting from mapping each character of a first portion of the payee name to a limited character set.

In an embodiment wherein the module is an encryption module for calculating the numeric sequence by operating an encryption function on at least a portion of the payee name and the payment amount, the numeric sequence comprises an encrypted number representing the result of operating the encryption function on a truncated portion of the payee name and the payment amount or a compressed representation of the truncated portion of the payee name and the payment amount. The truncated portion of the payee name may comprise of the result of mapping each character of a portion of the payee name to a limited character set.

In an embodiment wherein the module is a compression module for calculating the numeric sequence by operating a compression function on at least a portion of the payee name and the payment amount, the numeric sequence comprises a compressed number representing the result of operating the compression function on a truncated portion of the payee name and the payment amount. Again, the truncated portion of the payee name may consist of a limited character set payee name resulting from mapping each character of the truncated portion of the payee name to a limited character set.

In all embodiments, the system may further comprises a printer for printing at least the MICR representation of a routing number and an account number and the MICR representation of the numeric sequence in MICR ink on negotiable instrument stock.

A second aspect of the present invention is to provide a method of printing a negotiable instrument. The method comprises receiving negotiable instrument printing instructions, the instructions comprising a payee name and a payment amount and calculating a numeric sequence using a function selected from a group of functions consisting of: i) the numeric sequence representing the result of operating a hash function on at least a portion of the payee name and the payment amount; ii) the numeric sequence representing the result of operating an encryption function on at least a portion of the payee name and the payment amount; and iii) the numeric sequence representing the result of operating a compression function on at least a portion of the payee name and the payment amount. The method further comprises generating a negotiable instrument image file, the image file comprising: i) a recognizable alpha numeric representation of the payee name within a payee field; ii) a recognizable numeric representation of the payment amount within a numerical amount field; iii) a recognizable alpha numeric representation of the payment amount within an alpha numeric amount field; iv) a MICR representation of a routing number and an account number within a first MICR zone across the bottom of the negotiable instrument; and v) a MICR representation of the numeric sequence within a second MICR zone across the top of the negotiable instrument, the MICR representation in the second MICR zone being in an inverted relationship to the MICR representation in the first MICR zone. Further yet, the method comprises sending a representation of the negotiable instrument image file to a printer that prints at least the MICR representation of a routing number and an account number and the MICR representation of the numeric sequence in MICR ink on negotiable instrument stock.

In an embodiment wherein the numeric sequence represents the result of operating a hash function on at least a portion of the payee name and the payment amount, the numeric sequence may include a hash number representing the result of operating the hash function on a truncated portion of the payee name and the payment amount. The truncated portion of the payee name may consist of a limited character set payee name resulting from mapping each character of a first portion of the payee name to a limited character set.

The method may further comprise calculating a compressed number representing the result of operating a compression function on the truncated portion of the payee name and the payment amount and the numeric sequence may comprise both the hash number and the compressed number.

In an embodiment wherein the numeric sequence represents the result of operating an encryption function on at least a portion of the payee name and the payment amount, the numeric number consists of an encrypted number representing the result of operating the encryption function on a truncated portion of the payee name and the payment amount. The truncated portion of the payee name may consist of a limited character set payee name resulting from mapping each character of a first portion of the payee name to a limited character set and the encrypted number may comprise the result of operating the encryption function on a compressed representation of the truncated portion of the payee name and the payment amount.

In an embodiment wherein the numeric sequence represents the result of operating a compression function on at least a portion of the payee name and the payment amount, the numeric sequence consists of a compression number representing the result of operating the compression function on a truncated portion of the payee name and the payment amount. The truncated portion of the payee name may consist of a limited character set payee name resulting from mapping each character of a first portion of the payee name to a limited character set.

For a better understanding of the present invention, together with other and further aspects thereof, reference is made to the following description, taken in conjunction with the accompanying drawings, and its scope will be pointed out in the appended clams.

BRIEF DESCRIPTION OF THE DRAWINGS

FIGS. 2a, 2b, and 2c each show an exemplary embodiment of a secure negotiable instrument in accordance with an embodiment of the present invention;

FIG. 6 is an exemplary mapping table for compressing an alpha numeric string of characters in accordance with one embodiment of the present invention;

FIG. 9a is a table representing an exemplary check log in accordance with one embodiment of the present invention;

FIG. 9b is a table representing an exemplary authentication log in accordance with one embodiment of the present invention;

DETAILED DESCRIPTION OF THE EXEMPLARY EMBODIMENTS

Figure 1:
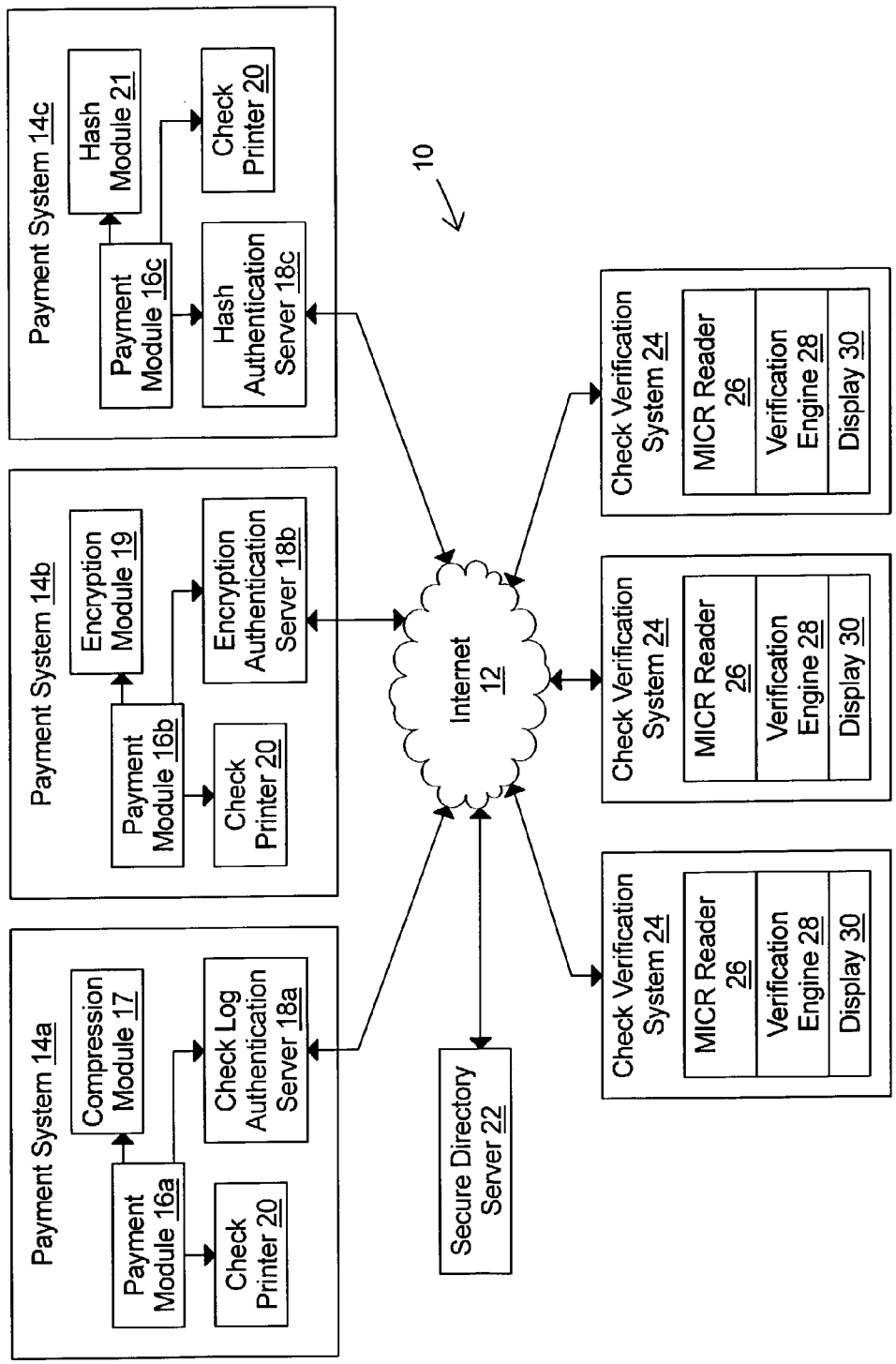
FIG. 1 is a block diagram showing an exemplary embodiment of the present invention.

The present invention is now described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

It should also be appreciated that many of the elements discussed in this specification may be implemented in hardware circuit(s), a processor executing software code, or a combination of a hardware circuit and a processor executing code. As such, the term circuit as used throughout this specification is intended to encompass a hardware circuit (whether discrete elements or an integrated circuit block), a processor executing code, or a combination of a hardware circuit and a processor executing code, or other combinations of the above known to those skilled in the art.

The block diagram of FIG. 1 represents an overview of a secure check printing and payment verification system 10 in accordance with a first embodiment of the present invention. The system 10 includes plurality of payment systems 14a, 14b, and 14c each coupled to the Internet 12. Also coupled to the Internet 12 is a secure directory server 22 and a plurality of check verification systems 24.

Each payment system 14a, 14b, and 14c may be securely located a secure check printing facility controlled by the maker of a secure negotiable instrument 32a, 32b, and 32c (FIG. 2a, FIG. 2b, and FIG. 2c respectively) and each check verification system 24 may be located at each of a plurality of banks, retail establishments, check cashing establishments, or other check cashing service provider locations where the secure check 32 may be presented for payment. The secure directory server 22 may be located at a third party directory service provider location.

In operation, each payment system 14a, 14b, and 14c both prints secure negotiable instruments 32 and authenticates critical payment information, such as the name of the payee and the payment amount of the secure negotiable instrument 32, when it receives an authentication request from one of the check verification systems 24. When a secure negotiable instrument is presented for payment at one of the check verification systems 24, the check verification system 24 will query the secure directory server 22 to obtain a network address or universal resource locator (URL) of the payment system 14a, 14b, and 14c that issued the secure negotiable instrument 32. The check verification system 24 then sends an authentication request to the payment system 14a, 14b, or 14c that issued the negotiable instrument and receives a response message that may be an invalid message if the secure negotiable instrument has already been authenticated (e.g. the presented document may be a duplicate) or the response message may be an authentication response that includes authenticated critical payment information such as the name of the payee and the payment amount as originally printed on the secure negotiable instrument 32 such that the payment verification system 24 may display such authenticated critical payment information to the operator so that the operator can verify that the payment information on the face of the secure negotiable instrument has not been altered.

Payment Systems

The payment system 14a comprises a payment module 16a, a compression module 17, a check printer 20, and a check log authentication server 18a. The payment module 16a receives payment instructions from an accounts payable system (not shown) to issue a check payment by printing a secure negotiable instrument 32a (FIG. 2a), sends critical payment information to the compression module 17, obtains a numeric sequence 44a from the compression module 17, sends negotiable instrument printing instructions to a check printer 20, and sends critical payment information to a check log authentication server 18a.

The secure negotiable instrument 32a that is printed by the check printer 20 of the payment module 16a includes typical payment information in a typical check format such as: (i) an identification of the routing code 36, account number 38, and check number 40 printed in MICR ink and MICR font within a MICR zone 34 across the bottom edge of the secure negotiable instrument 32; (ii) an identification of a payee name printed within a payee field 46 following a "pay to the order of" designation; (iii) an identification of the amount printed within a numeric amount field 52 and within an alpha numeric amount filed 53; (iv) a date printed within a date field 50; (v) a check number printed within a check number field 41; (vi) a memo printed within a memo field 48; and (vii) a signature field 54.

In addition to these typical fields, the secure negotiable instrument 32a includes a numeric sequence 44a that comprises a compressed representation of at least a portion of the payee name and the amount. The numeric sequence 44*a* is printed as a second line of MICR characters in MICR ink upside down and backwards within an upper MICR zone 42 across the top edge of the secure negotiable instrument 32*a*. More specifically, the numeric sequence 44*a* in the second line of MICR characters may be printed in an inverted relationship to the routing code 36, account number 38, and check number 40 printed within MICR zone 34, so that its reading may be facilitated by passing the check upside-down through any commercially available MICR reader that is designed to read uninverted MICR font printed within the MICR zone close to the edge of a document.

The critical payment information sent to the check log authentication server 18*a* comprises at least the payee name, the payment, and a unique identifier such as the check number. The check log authentication server 18*a* stores the payee name and the payment amount in association with the check number or other unique identifier of the secure negotiable instrument 32*a*. The authentication server 18*a* also receives an authentication request over the Internet 12 from one of the check verification systems 24 when the secure negotiable instrument 32*a* is presented for payment. The authentication request will at least include the unique identifier and may also include the numeric sequence 44*a*. Upon receiving an authentication request, the check log authentication server 18*a* can provide an authentication response that includes the critical payment information as received from the payment module 16*a*. As will be discussed herein, upon receipt of an authentication response, the check verification system 24 may display the critical payment information (e.g. the payee name and the payment amount) on a display screen 30 such that the operator of the check verification system 24 may verify that the payee name and the payment amount printed in fields 46, 52, and 53 have not been altered.

It should be appreciated that although the authentication request need only include the unique identifier, there exists a security advantage to include the payee name and the payment amount from the numeric sequence 44*a*. If the authentication server 18*a* only provides critical payment information in an authentication response if the payee name and the amount in the authentication request matches the critical payment information, then it is not feasible for the operator of any check verification system 24 to assemble a maker's check log by placing a plurality of authentication requests to the authentication server 18*a*, each with a different check number.

It should also be appreciated that the authentication server 18*a* may only provide a single authentication response per secure negotiable instrument 32*a*. If a payee attempts to duplicate the negotiable instrument, the authentication server 18*a* may provide an authentication response the first time the secure negotiable instrument 32*a* is presented for payment, but will not provide such a response upon receiving a second authentication request with the same unique identifier. Instead, it may provide an invalid response message.

The payment system 14*b* comprises a payment module 16*b*, an encryption module 19, a check printer 20, and an encryption authentication server 18*b*. The payment module 16*b* receives payment instructions from an accounts payable system (not shown) to issue a check payment by printing a secure negotiable instrument 32*b* (FIG. 2*b*), sends critical payment information to the encryption module 19 and obtains a numeric sequence 44*b* from the encryption module 19, and sends negotiable instrument printing instructions to a check printer 20.

The secure negotiable instrument 32*b* that is printed by the check printer 20 in accordance with the negotiable instrument printing instructions from the payment module 16*b* includes the typical payment information discussed above and the numeric sequence 44*b* printed as a second line of MICR characters inverted within the MICR zone 42 across the top of the secure negotiable instrument 32*b*. The numeric sequence 44*b* comprises a ciphered number representing the result of encrypting and compressing at least a portion of the payee name and the payment amount.

The encryption authentication server 18*b* receives an authentication request over the Internet 12 from one of the check verification systems 24 when the secure negotiable instrument 32*b* is presented for payment. The authentication request will include at least the numeric sequence 44*b* and may include a unique identifier such as the check number.

The encryption authentication server 18*b* operates a reverse of the encryption and compression algorithms as utilized by the payment module 16*b* in printing the secure negotiable instrument 32*b*. As such, the encryption authentication server 18*b* may decipher the at least a portion of the payee name and the payment amount as originally encrypted and compressed into the ciphered number and may provide an authentication response that includes the deciphered at least a portion of the payee name and the payment amount. Again, upon receipt of an authentication response, the check verification system 24 may display the critical payment information (e.g. the payee name and the payment amount) on a display screen 30 such that the operator of the check verification system 24 may verify that the payee name and the payment amount printed in fields 46, 52, and 53 have not been altered.

It should be appreciated that because the ciphered number can not feasibly be altered to match an alteration of fields 46, 52, or 53, any alteration of such fields may be readily detected.

Again, it should also be appreciated that the authentication server 18*b* may only provide a single authentication response per secure negotiable instrument 32*b* to prevent a payee from duplicating the secure negotiable instrument 32*b*.

The payment system 14*c* comprises a payment module 16*c*, a hashing module 21, a check printer 20, and a hash authentication server 18*c*. The payment module 16*c* receives payment instructions from an accounts payable system (not shown) to issue a check payment by printing a secure negotiable instrument 32*c* (FIG. 2*c*), sends critical payment information to the hashing module 21, obtains a numeric sequence 44*c* from the hashing module 21, and sends negotiable instrument printing instructions to a check printer 20.

The secure negotiable instrument 32*c* that is printed by the check printer 20 in accordance with the negotiable instrument printing instructions from the payment module 16*c* includes the typical payment information discussed above and a numeric sequence 44*c* that comprises at least a hashed number representing the result of operating a secure hash function on at least a portion of the payee name and the payment amount and may include a compressed representation of at least the portion of the payee name and the payment amount that is utilized by the hashing algorithm to generate the hashed number. The numeric sequence 44*c* may be printed in the second line of MICR characters inverted within in the MICR zone 42.

The authentication server 18c receives an authentication request over the Internet 12 from one of the check verification systems 24 when the secure negotiable instrument 32 is presented for payment. The check verification request will include the numeric sequence 44c (or may include the at least a portion of the payee name, the payment amount, and the hashed number, as manually input by the operator).

The hashing authentication server 18c operates the same hashing function as used by the payment module 16c to generate a second hashed number. If the second hashed number matches the hashed number from the authentication request, the authentication server may return an authentication response that includes the at least a portion of the payee name and the payment amount input to the hashing function.

Again, upon receipt of an authentication response, the check verification system 24 may display the at least a portion of the payee name and the payment amount, received in the response, on a display screen 30 such that the operator of the check verification system 24 may verify that the payee name and the payment amount printed in fields 46, 52, and 53 have not been altered.

It should be appreciated that because the hashed number can not feasibly be altered to match an alteration to fields 46, 52, or 53 (or even alteration of the compressed representation of the at least a portion of the payee name and payment amount that is included in the numeric sequence 44c), any alteration of such fields (or the numeric sequence 44c) may be readily detected.

Again, it should also be appreciated that the authentication server 18c may only provide a single authentication response per negotiable instrument to prevent a payee from duplicating the negotiable instrument 32c.

It should be appreciated that the secure negotiable instrument 32a, 32b, and 32c as disclosed herein may be used just like any traditional check. The addition of the second line of MICR characters inverted within the MICR zone 42, while it enables functionality discussed herein, has not diminished the essential ordinary utility of the check. The second line of MICR characters may be ignored by the bearer and casher of the secure negotiable instrument 32, who may simply cash or deposit the secure negotiable instrument 32 like any ordinary check in accordance with commonly used check processing techniques.

Figure 3B:
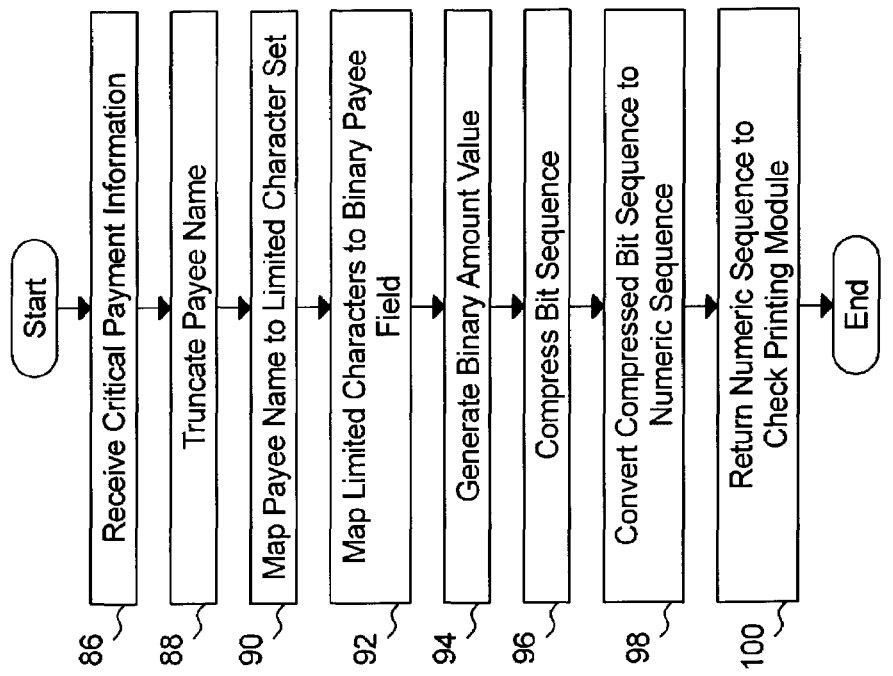
FIG. 3b is a flow chart showing exemplary operation of a compression module in accordance with one embodiment of the present invention.
Figure 3A:
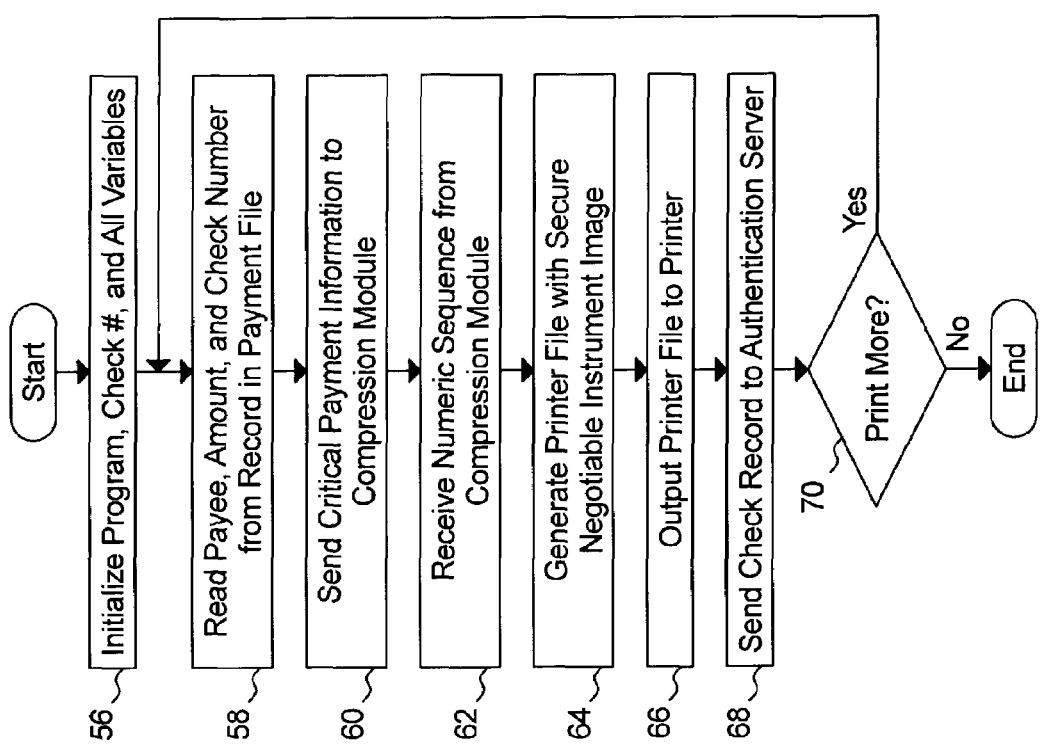
FIG. 3a is a flow chart showing exemplary operation of a payment module in accordance with one embodiment of the present invention.

A more detailed description of the above described systems and methods is included herein Payment Module FIG. 3a shows a flowchart representing exemplary operation of the payment module 16a. Step 56 represents initializing the payment module 16a to print a sequence of one or more secure negotiable instruments 32a. Such initialization may include setting of the check number and all appropriate check printing variables, including, but not limited to, those corresponding to an applicable checking account routing code, account number, and check number.

Step 58, represents the payment module 16a reading the payee, the amount, and other payment information from the appropriate record in the payment file received from the accounts payable system.

Step 60 represents sending the critical payment information to the compression module 17a and step 62 represents receiving the compressed numeric sequence back from the encryption module 17a.

Step 64 represents generating a printer file that includes the image of the secure negotiable instrument 32a and step 66 represents sending the printer file to the printer 20.

Step 68 represents sending the critical payment information and the check number to the authentication server 18a.

Step 70 represents a determination of whether there are more negotiable instruments to print. If yes, the payment module 16a returns to step 58 where it obtains payment information for another negotiable instrument. Alternatively, if there are no more negotiable instruments to print, operation of the payment module 16a ends.

The compression module 17 performs various data compression steps that together provide for the compression module 17 to receive the critical payment information, compress the critical payment information into a string of numeric characters approximately 40 characters in length (e.g. the compressed numeric sequence), and return the compressed numeric sequence back to the payment module 16a.

Referring to FIG. 3b in conjunction with FIG. 1, operation of the compression module 17 is discussed. Step 86 represents the compression module 17 receiving the critical payment information from the payment module 16a. As previously discussed, the critical payment information may include the name of the payee and the amount of the payment. The name of the payee and the amount of the payment may be an alpha numeric string in excess of 100 ASCII characters in length. Because MICR font only supports numeric characters 0–9, because MICR font has a fixed font size, and because the physical size of the secure negotiable instrument 32a is limited, it is not possible to print the critical payment information on the face of the secure negotiable instrument 32a in MICR font across the top of the check. Therefore, step 88 represents a first compression step wherein the payee name string is truncated to the first 40 characters.

Because each character of an ASCII character set corresponds to an 8-bit value, the first 40 characters would correspond to a 320-bit binary string. Approximately 100 numeric characters would be required to represent a 320-bit binary string which again remains too long of a string to print on the top of the secure negotiable instrument 32a in MICR font. Therefore, step 90 represents a second compression step wherein each of the first 40 ASCII characters is mapped to a character from a limited character set having 64 or fewer characters utilizing a mapping table such as that shown in FIG. 6.

The mapping table of FIG. 6 associates each ASCII character within column 120 with a character from a limited character set in column 124. The limited character set includes each of the numeric digits, upper case letters only, and some commonly used characters such as the space, period, and comma. Characters in the ASCII character set that correspond to characters in the limited character set are mapped to such characters, lower case letters in the ASCII character set are mapped to upper case letters in the limited character set, and other remaining ASCII characters simply map to an underscore. Because the limited character set of FIG. 6 has fewer than 64 characters, each character can be mapped to a 6-bit binary value as set forth in column 126.

Returning to FIG. 3b, step 92 represents assembling a binary payee field by mapping each limited character to its 6-bit binary value and sequencing each such binary value into a 240-bit binary payee field. Step 94 represents generating a 14-bit binary amount value and appending such binary amount value to the end of the 240-bit binary payee field to yield a 254-bit binary field.

The systems and methods of the present invention are most useful for check amounts less than $10,000. While the invention may be useful for checks greater than $10,000, such checks are not typically cashed without the casher maintaining some recourse against the payee should the check be dishonored. Because any whole dollar amount less than $10,000 may be represented by a 14-bit binary value, the binary amount value will be a 14-bit value.

Step 96 represents a third compression step wherein a known binary file compression algorithm such as WINZIP® available from Microsoft® or another known compression algorithm that will compress the 254-bit sequence by approximately 50% or greater yielding a compressed bit sequence on the order of 128 bits.

Step 98 represents converting the compressed bit sequence to a base-10 number such that it can be represented by a sequence of numerals (0–9) that is approximately 40 numerals in length. Such base-10 number is the compressed numeric sequence that is returned to the payment module 16a at step 100.

Figure 4B:
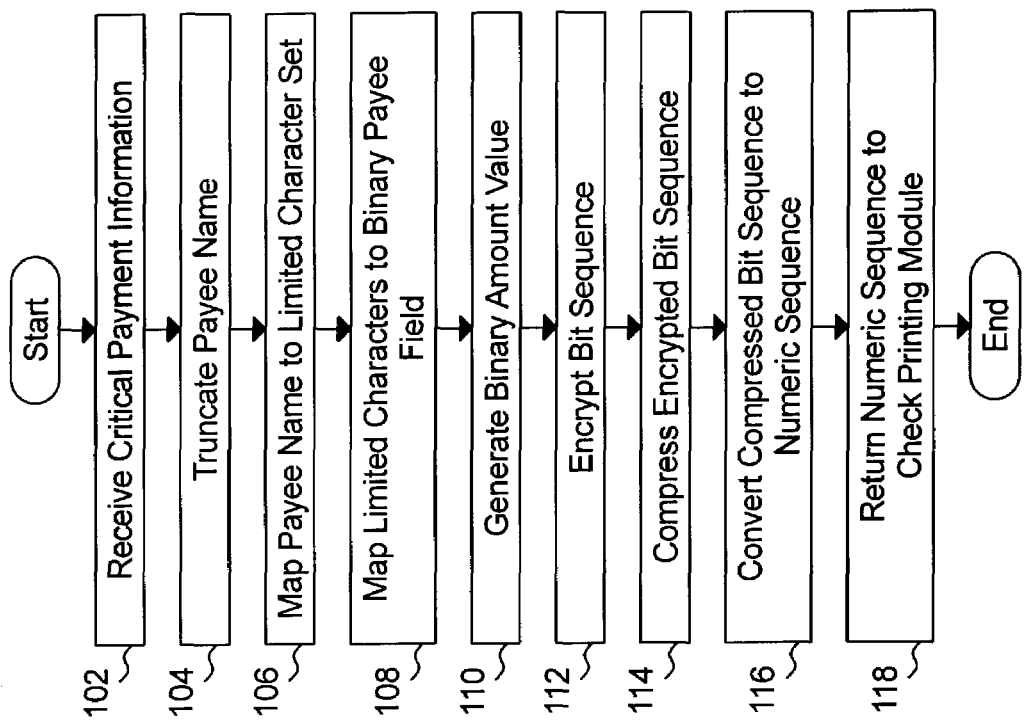
FIG. 4b is a flow chart showing exemplary operation of an encryption module in accordance with one embodiment of the present invention.
Figure 4A:
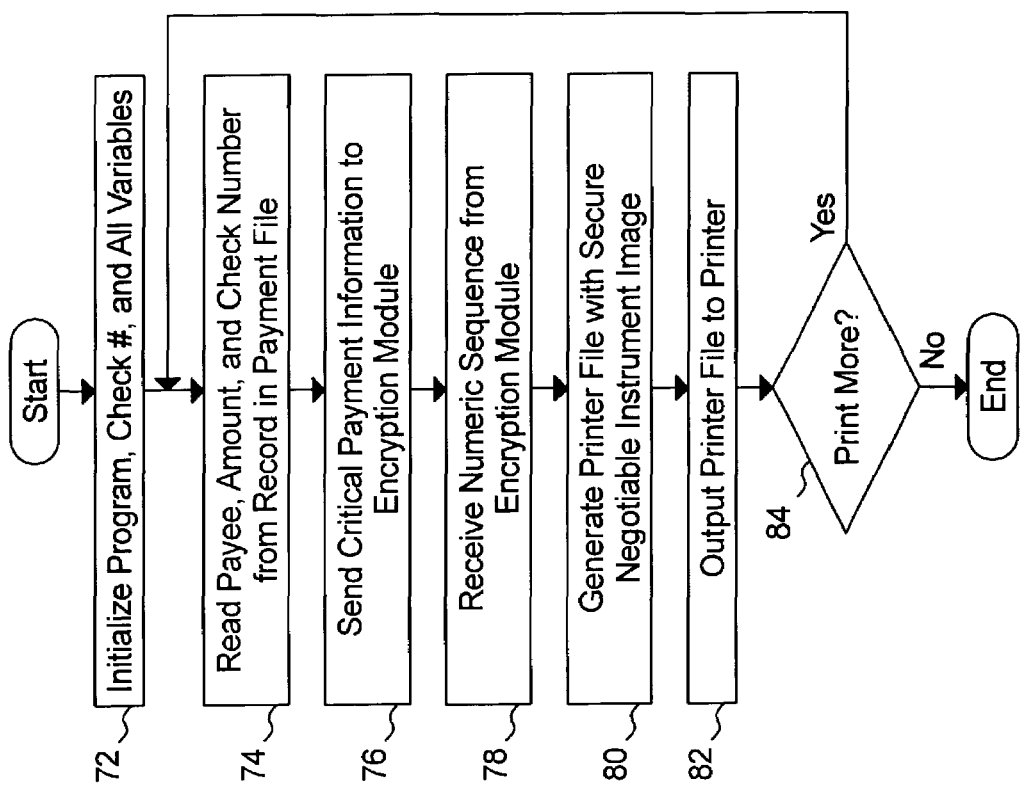
FIG. 4a is a flow chart showing exemplary operation of a payment module in accordance with one embodiment of the present invention.

FIG. 4a shows a flowchart representing exemplary operation of the payment module 16b. Step 72 represents initializing the payment module 16b to print a sequence of one or more secure negotiable instruments 32b. Again, such initialization may include setting of the check number and all appropriate check printing variables, including, but not limited to, those corresponding to an applicable checking account routing code, account number, and check number.

Step 74, represents the payment module 16b reading the payee, the amount, and other payment information from the appropriate record in the payment file received from the accounts payable system.

Step 76 represents sending the critical payment information to the encryption module 19 and step 78 represents receiving the encrypted numeric sequence back from the encryption module 19.

Step 80 represents generating a printer file that includes the image of the secure negotiable instrument 32b and step 82 represents sending the printer file to the printer 20.

Step 84 represents a determination of whether there are more negotiable instruments to print. If yes, the payment module 16b returns to step 74 where it obtains payment information for another negotiable instrument. Alternatively, if there are no more negotiable instruments to print, operation of the payment module 16b ends.

The encryption module 19 operates an encryption algorithm and performs various data compression steps that together provide for the encryption module 19 to receive the critical payment information, compress and encrypt the critical payment information into a string of numeric characters approximately 40 characters in length (e.g. the encrypted numeric sequence), and return the encrypted numeric sequence back to the payment module 16b.

Referring to FIG. 4b in conjunction with FIG. 1, operation of the encryption module 19 is shown. Step 102 represents the encryption module 19 receiving the critical payment information from the payment module 16b. As previously discussed, the critical payment information may include the name of the payee and the amount of the payment and, may be an alpha numeric string in excess of 100 ASCII characters in length. Because encryption does not alter string length, the encrypted value will be an ASCII character string of the same length and, as previously discussed, because MICR font only supports numeric characters 0–9, because MICR font has a fixed font size, and because the physical size of the negotiable instrument 32b is limited, it is not possible to print such an encrypted value on the face of the secure negotiable instrument 32 in MICR font inverted within the MICR zone 42. Therefore, step 104 represents a first compression step wherein the payee string is truncated to the first 40 characters.

As previously discussed, the first 40 ASCII characters would correspond to a 320-bit binary string which would correspond to approximately 100 numeric characters. Therefore, step 106 represents a second compression step wherein each of the first 40 ASCII characters is mapped to a character from a limited character set having 64 or fewer characters utilizing a mapping table such as that shown in FIG. 6.

Step 108 represents assembling a binary payee field by mapping each limited character to its 6-bit binary value and sequencing each such binary value into a 240-bit binary payee field. Step 110 represents generating a 14-bit binary amount value and appending such binary amount value to the end of the 240-bit binary payee field to yield a 254-bit binary field.

Step 112 represents encrypting the 254-bit sequence to obtain an encrypted bit sequence that is on the order of 254-bits in length utilizing a secure encryption algorithm and key. Following encryption, yet a third compression step may be performed at step 114. The third compression step may include utilizing a known binary file compression algorithm such as WINZIP® available from Microsoft® or another known compression algorithm that will compress the encrypted bit sequence by approximately 50% or greater yielding a compressed bit sequence on the order of 128 bits.

Step 116 represents converting the compressed bit sequence to a base-10 number such that it can be represented by a sequence of numerals (0–9) that is approximately 40 numerals in length. Such base-10 number is the encrypted numeric sequence that is returned to the payment module 16b at step 118.

Figure 5B:
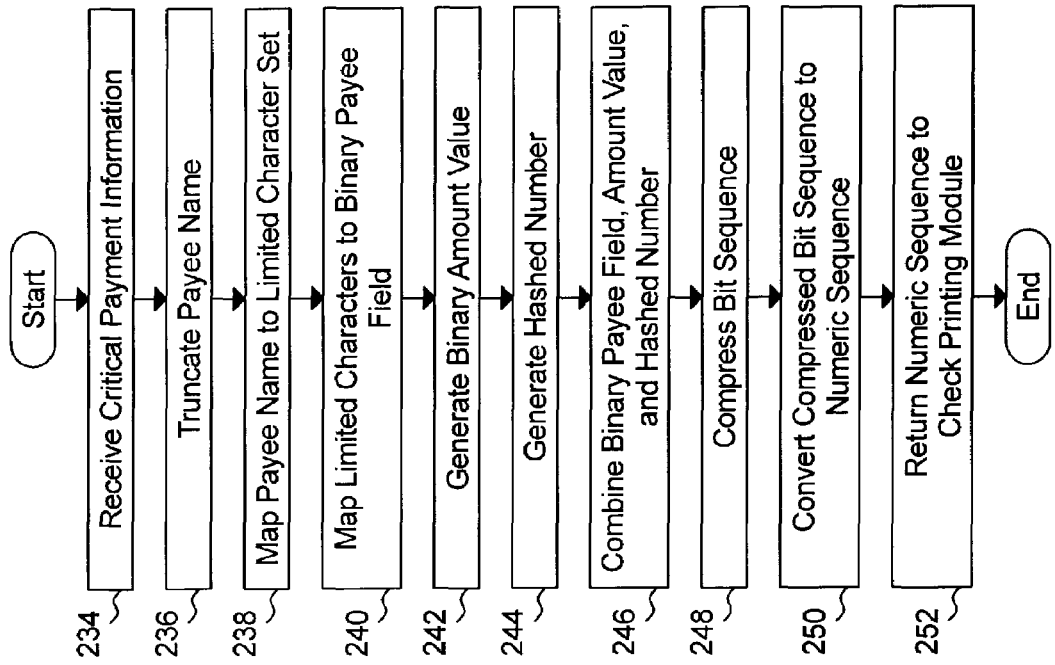
FIG. 5b is a flow chart showing exemplary operation of a hashing module in accordance with one embodiment of the present invention.
Figure 5A:
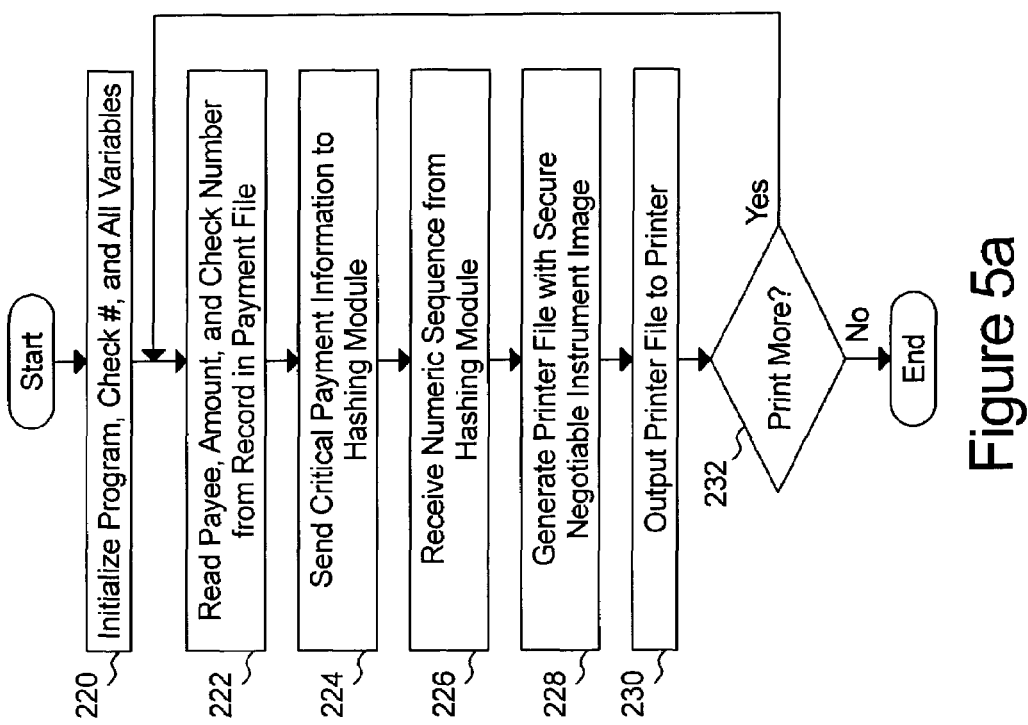
FIG. 5a is a flow chart showing exemplary operation of a payment module in accordance with one embodiment of the present invention.

FIG. 5a shows a flowchart representing exemplary operation of the payment module 16c. Step 220 represents initializing the payment module 16c to print a sequence of one or more secure negotiable instruments 32c. Again, such initialization may include setting of the check number and all appropriate check printing variables, including, but not limited to, those corresponding to an applicable checking account routing code, account number, and check number.

Step 222, represents the payment module 16c reading the payee, the amount, and other payment information from the appropriate record in the payment file received from the accounts payable system.

Step 224 represents sending the critical payment information to the hashing module 21 and step 226 represents receiving the hashed numeric sequence back from the hashing module 21.

Step 228 represents generating a printer file that includes the image of the secure negotiable instrument 32c and step 230 represents sending the printer file to the printer 20.

Step 232 represents a determination of whether there are more negotiable instruments to print. If yes, the payment module 16c returns to step 222 where it obtains payment information for another negotiable instrument. Alternatively, if there are no more negotiable instruments to print, operation of the payment module 16c ends.

The hashing module 21 operates a hashing algorithm and performs various data compression steps that together provide for the hashing module 21 to receive the critical payment information, compress the critical payment information, generate a hashed number based on the compressed critical payment information, further compress the combination of the critical payment information and the hashed number into a string of numeric characters approximately 40 characters in length (e.g. the numeric sequence), and return the numeric sequence back to the payment module 16c.

Referring to FIG. 5b in conjunction with FIG. 1, operation of the hashing module 21 is shown. Step 234 represents the hashing module 21 receiving the critical payment information from the payment module 16c. As previously discussed, the critical payment information may include the name of the payee and the amount of the payment and, may be an alpha numeric string in excess of 100 ASCII characters in length. Therefore, step 236 represents a first compression step wherein the payee string is truncated to the first 40 characters.

As previously discussed, the first 40 ASCII characters would correspond to a 320-bit binary string which would correspond to approximately 100 numeric characters. Therefore, step 238 represents a second compression step wherein each of the first 40 ASCII characters is mapped to a character from a limited character set having 64 or fewer characters utilizing a mapping table such as that shown in FIG. 6.

Step 240 represents assembling a binary payee field by mapping each limited character to its 6-bit binary value and sequencing each such binary value into a 240-bit binary payee field. Step 242 represents generating a 14-bit binary amount value.

Step 244 represents generating a hashed number using the binary payee field and the 14-bit binary amount value as inputs to a secure hashing function and step 246 represents combining the binary payee filed, the binary amount value, and the hashed number into a single binary sequence.

Step 248 represents a third compression step wherein a known binary file compression algorithm such as WINZIP® available from Microsoft® or another known compression algorithm that will compress a binary file by approximately 50% or greater is used to compress the single binary sequence to yield a compressed bit sequence.

Step 250 represents converting the compressed bit sequence to a base-10 number such that it can be represented by a sequence of numerals (0–9) that is approximately 40 numerals in length. Such base-10 number is the numeric sequence that is returned to the payment module 16c at step 252.

Check Printer

The check printer 20 may be any commercially available MICR ink laser check printer (or a printer that prints in a combination of MICR ink and regular carbon based ink) that has the capability of printing the secure negotiable instrument 32 on blank check stock in accordance with a printer filed delivered by the payment module 16a, 16b, and 16c.

Authentication Servers

Figure 7B:
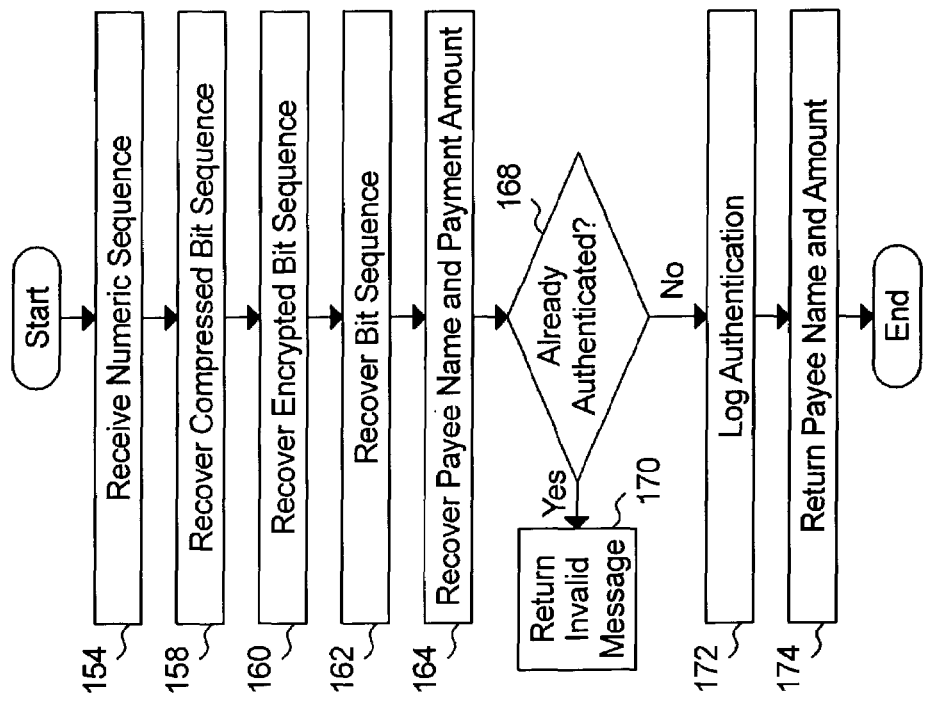
FIG. 7b is a flow chart showing exemplary operation of an encryption authentication server in accordance with one embodiment of the present invention.
Figure 7A:
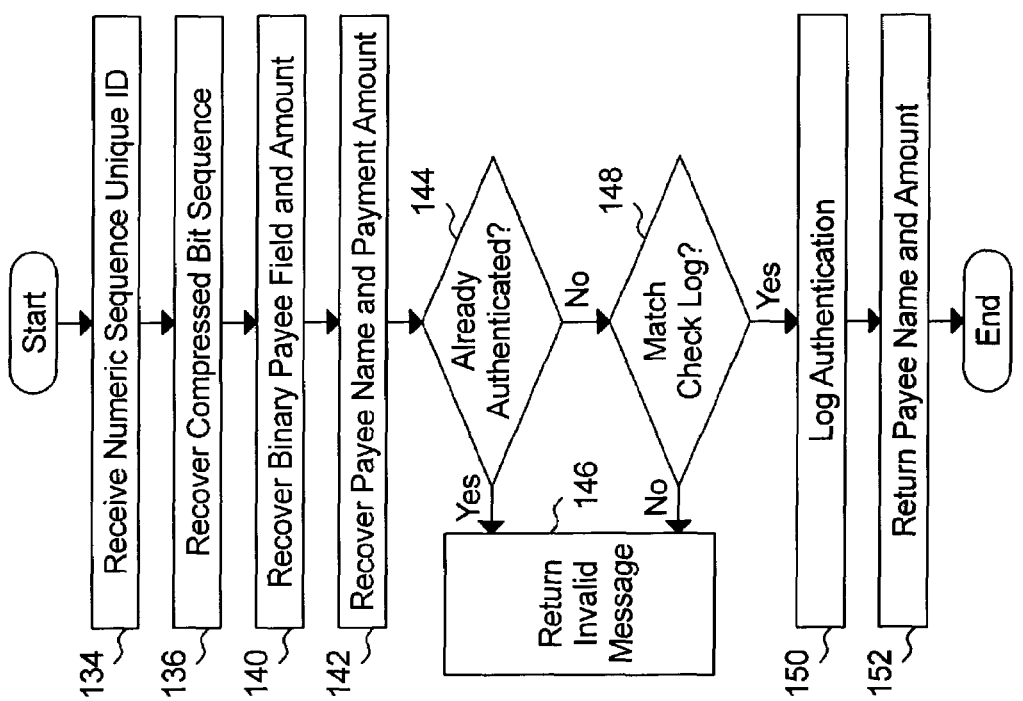
FIG. 7a is a flow chart showing exemplary operation of a check log authentication server in accordance with one embodiment of the present invention.

Referring to FIG. 7a in conjunction with FIG. 1, exemplary operation of the check log authentication server 18a is shown.

Step 134 represents receiving an authentication request from a check verification system 24 that includes a numeric sequence 44a and includes a unique identifier such as the check number 40 from the MICR zone 34 across the bottom edge of the secure negotiable instrument 32.

Step 136 represents recovering the compressed bit sequence by converting the numeric sequence to its binary equivalent.

Step 140 represents recovering the bit sequence by decompressing the compressed bit sequence utilizing a decompression scheme that corresponds to the compression scheme utilized to compress the bit sequence at step 96 of FIG. 3b.

Step 142 represents recovering the payee name and payment amount by converting the binary amount value of the bit sequence to its base-10 numeric equivalent and by recovering an ASCII representation of the first 40 characters of the payee name by mapping each 6-bit segment of the binary payee value of the bit sequence to its corresponding character within the limited character set and then mapping each limited character to its corresponding ASCII character utilizing the mapping table of FIG. 6.

Step 144 represents determining if the secure negotiable instrument 32 has already been authenticated by matching the check number to a check log 192 as shown in FIG. 9a. The check log 192 comprises a plurality of records 194 each including a unique identifier such as the check number. Associated with each check number is the name of the payee in field 196 and amount in field 198, both as reported to the check log authentication server 18a during step 68 of FIG. 3a. Also associated with each check number is an indication of whether the check has already been authenticated in field 200. This indication enables the check log authentication server 18a to only authenticate a check one time.

If the secure negotiable instrument 32a has already been authenticated, an invalid message is returned to the check verification system 24 at step 146. If the secure negotiable instrument 32a has not already been authenticated, step 148 represents determining if the recovered payee name and payment amount match the payee name and payment amount provided by the payment module 16a at step 68 of FIG. 3a and stored in fields 196 and 198 respectively of the check log 192. If there is no match, an invalid message is returned to the check verification system 24 at step 146.

If there is a match, the authentication is logged in field 200 of the check log 192 at step 150 (to prevent authenticating the same secure negotiable instrument 32 a second time) and an authentication response message that includes the name of the payee and the amount is returned to the check verification system 24 at step 152.

Referring to FIG. 7b in conjunction with FIG. 1, exemplary operation of the encryption authentication server 18b is shown.

Step 154 represents receiving an authentication request from a check verification system 24 that includes a numeric sequence 44b from the second line of MICR characters of the secure negotiable instrument 32b.

Step 158 represents recovering the compressed bit sequence by converting the numeric sequence to its binary equivalent.

Step 160 represents recovering the encrypted bit sequence by decompressing the compressed bit sequence utilizing a decompression scheme that corresponds to the compression scheme utilized to compress the encrypted bit sequence at step 114 of FIG. 4b.

Step 162 represents recovering the bit sequence by decrypting the encrypted bit sequence utilizing an decryption algorithm that corresponds to the encryption algorithm utilized to generate the encrypted bit sequence at step 112 of FIG. 4b.

Step 164 represents recovering the payee name and payment amount by converting the binary amount portion of the bit sequence to its base-10 numeric equivalent and by recovering an ASCII representation of the first 40 characters of the payee name by mapping each 6-bit segment of the binary payee portion of the bit sequence to its corresponding character within the limited character set and then mapping each limited character to its corresponding ASCII character utilizing the mapping table of FIG. 6.

Step 168 represents determining if the secure negotiable instrument 32 has already been authenticated by matching the payment information (or check number) to an authentication log 202 as shown in FIG. 9b.

The authentication log 202 comprises a record 204 for each check that has already been authenticated. The check number may be used as the key. Associated with each authenticated check may be the payee name 206 and the amount 208 as recovered in step 164 of FIG. 7b. The authentication log 202 provides for the authentication server 18b to only authentication each secure negotiable instrument 32b one time. If the secure negotiable instrument 32 has already been authenticated, a record 204 that identifies the secure negotiable instrument 32b by check number will exist in the authentication log 202 and the server will return an invalid message to the check verification system 24 at step 170.

If the secure negotiable instrument 32b has not already been authenticated (e.g. no record yet exists in the authentication log 202), the authentication is logged by adding a record associated with the secure negotiable instrument 32b at step 172 (to prevent authenticating the same secure negotiable instrument 32 a second time) and an authentication response message that includes the name of the payee and the amount (as recovered) is returned to the check verification system 24 at step 174.

Figure 7C:
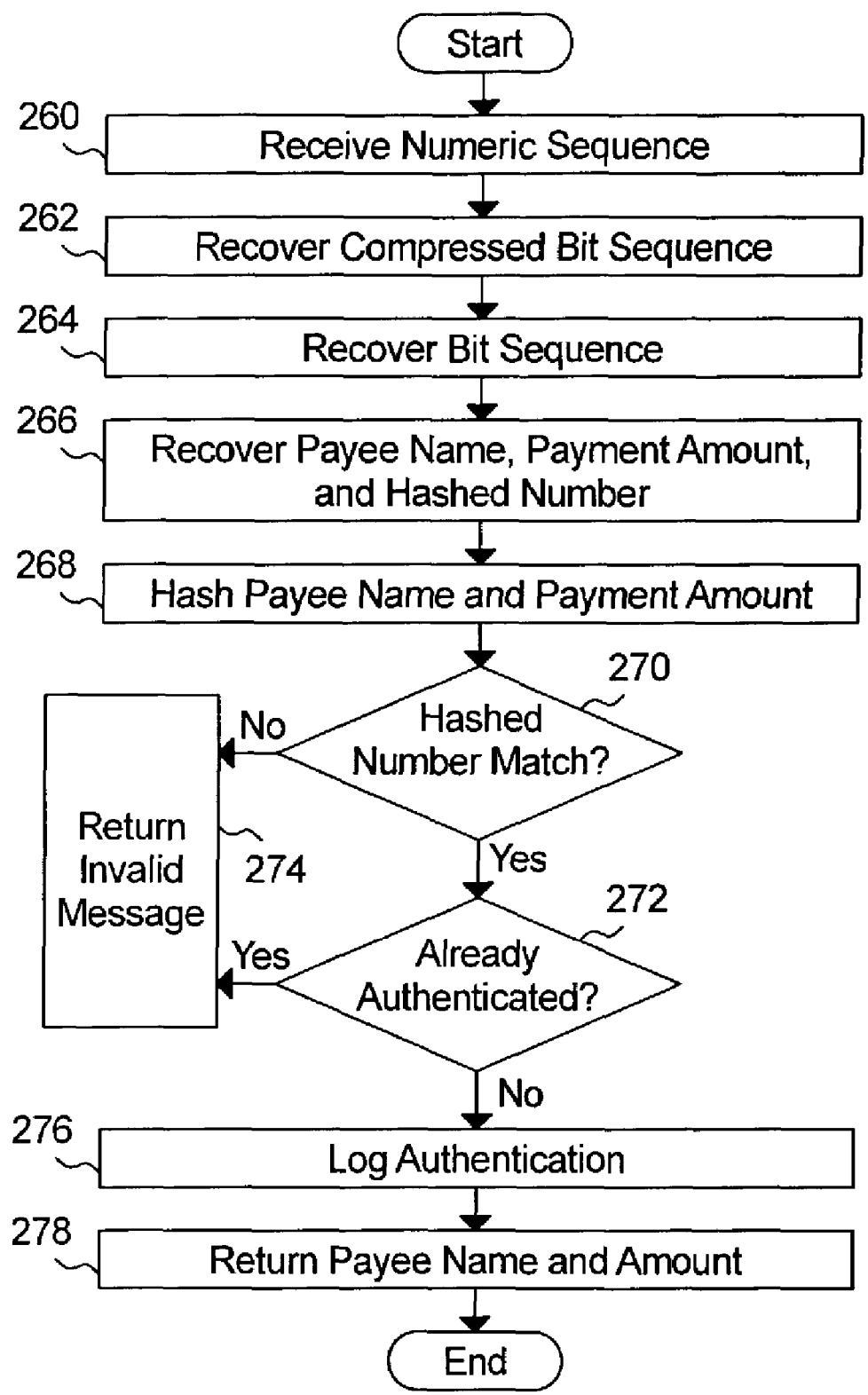
FIG. 7c is a flow chart showing exemplary operation of a hashing authentication server in accordance with one embodiment of the present invention.

Referring to FIG. 7c in conjunction with FIG. 1, exemplary operation of the hashing authentication server 18c is shown.

Step 260 represents receiving an authentication request from a check verification system 24 that includes a numeric sequence 44c from the second line of MICR characters of the secure negotiable instrument 32.

Step 262 represents recovering the compressed bit sequence by converting the numeric sequence to its binary equivalent.

Step 264 represents recovering the bit sequence by decompressing the compressed bit sequence utilizing a decompression scheme that corresponds to the compression scheme utilized to compress the bit sequence at step 248 of FIG. 5b.

Step 266 represents recovering the payee name, the payment amount, and the hashed number by converting the binary amount portion of the bit sequence to its base-10 numeric equivalent, by recovering an ASCII representation of the first 40 characters of the payee name by mapping each 6-bit segment of the binary payee portion of the bit sequence to its corresponding character within the limited character set and then mapping each limited character to its corresponding ASCII character utilizing the mapping table of FIG. 6, and recovering the hashed number from the hashed number portion of the bit sequence.

Step 268 represents hashing the recovered payee name and payment amount using the hashing algorithm utilized at step 244 of FIG. 5a and step 270 represents determining whether the hashed number yielded by step 268 matches the recovered hashed number. If they do not match, it can be concluded that the payee name or amount as compressed into the numeric sequence 44c has been altered and an invalid message will be returned to the payment verification system 24 at step 274.

If there is a match, step 272 represents determining if secure negotiable instrument 32c has already been authenticated by matching the payment information (or check number) to the authentication log 202. If the secure negotiable instrument 32c has already been authenticated, an invalid message is returned to the check verification system 24 at step 274.

If the secure negotiable instrument 32c has not already been authenticated, the authentication is logged in a new record 204 of the authentication log 202 at step 276 (to prevent authenticating the same secure negotiable instrument 32c a second time) and an authentication response message that includes the name of the payee and the amount (as recovered) is returned to the check verification system 24 at step 278.

Check Verification System

Each check verification system 24 includes a MICR reader 26, a verification engine 28, and a display 30.

The MICR reader 26 may be similar to many commercially available MICR readers, such as, for but one example, the SCANTEAM 8300 MICR Check Reader, available form Welch-Allyn, of Skaneateles Falls, N.Y. Such a MICR reader will read the MICR numbers located within a MICR zone near the edge of a document when such document is inserted into the MICR reader and will present the sequence of numerals to the verification engine 28.

To verify the secure negotiable instrument 32, the operator of the check verification system 24 may first insert the bottom edge of the secure negotiable instrument 32 into the MICR reader 26 such that the MICR reader 26 will read the routing code, the account number, and the check number from the MICR zone 34 across the bottom edge of the secure negotiable instrument 32 and may then insert the top edge of the secure negotiable instrument 32 into the MICR reader 26 such that the MICR reader 26 will read the numeric sequence 44 of the second line of MICR characters inverted within the MICR zone 42 across the top edge of the negotiable instrument 32. The routing number, the account number, the check number, and the numeric sequence 44 may presented to the verification engine 28.

The verification engine 28 then queries the secure directory server 22 to obtain a network address of the authentication server 18a, 18b, or 18c associated with the maker of the secure negotiable instrument 32 and then sends an authentication request to the authentication server 18a, 18b, or 18c.

After receiving an authentication response from the authentication server 18a, 18b, or 18c, the verification engine 28 may display the critical payment information received in the response on the display 30 such that the operator may compare the payee name and the payment amount from the authentication response to those printed on the face of the secure negotiable instrument 32 to verify that the payee name and the amount printed on the face of the secure negotiable instrument 32 have not been altered.

Figure 8:
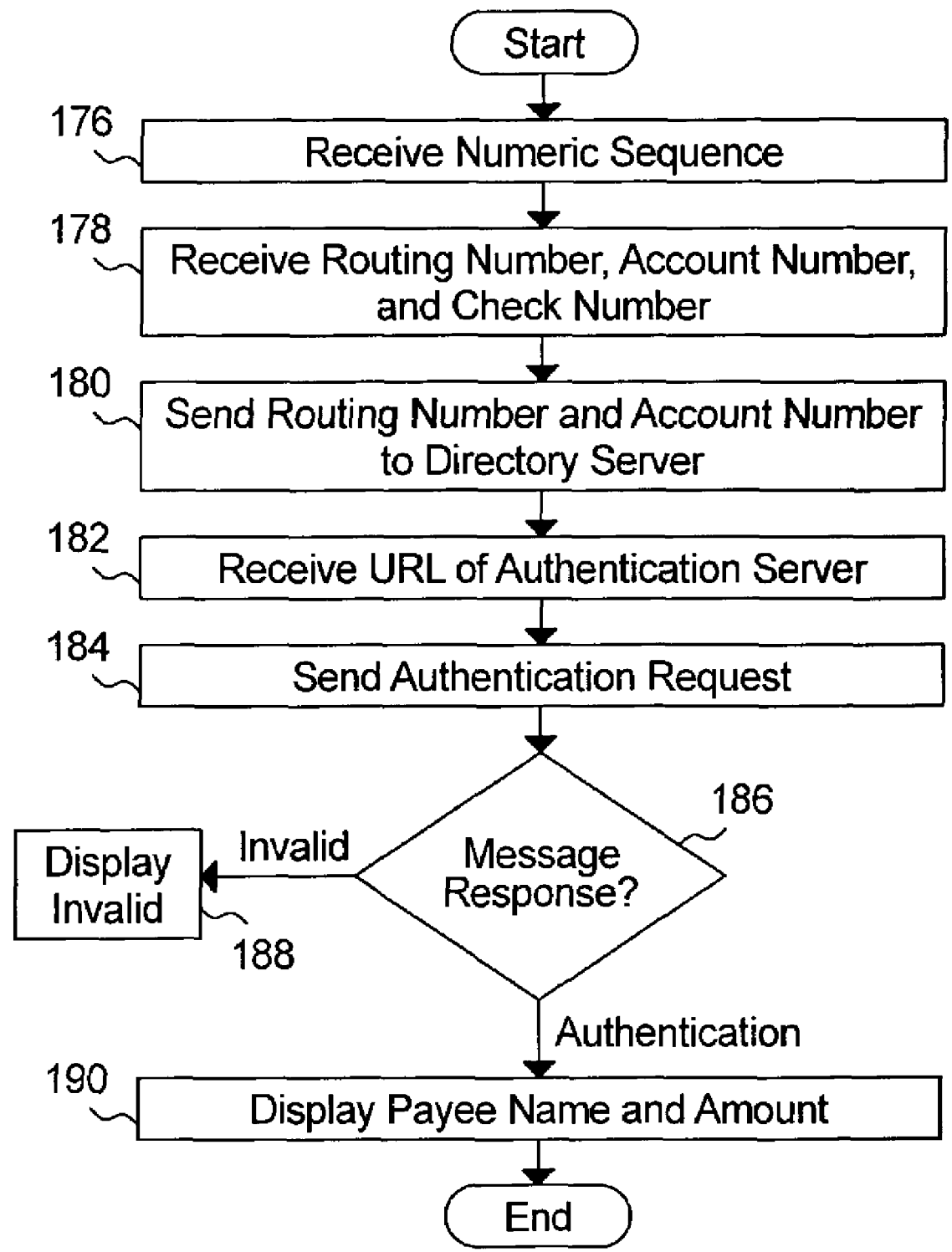
FIG. 8 is a flow chart showing exemplary operation of a check verification system in accordance with one embodiment of the present invention.

The flowchart of FIG. 8 represents exemplary operation of the verification engine 28.

Step 176 represents receiving the numeric sequence 44 from the MICR reader 26 and step 178 represents receiving the routing number, account number, and check number from the MICR reader 26.

Step 180 represents sending the routing number and account number to the secure directory server 22 and step 182 represents receiving the network address or universal resource locator (URL) of the authentication server 18a, 18b, or 18c that is associated with the maker of the secure negotiable instrument 32.

Step 184 represents sending an authentication request to the applicable authentication server 18a, 18b, or 18c.

Step 186 represents receiving a communication back from the authentication server 18a, 18b, or 18c which may be an invalidation message if the secure negotiable instrument has previously been authenticated or may be an authentication message. If the message is an invalidation message, an invalid message is displayed at step 188 such that the operator of the check verification system 24 will not accept the negotiable instrument 32 for payment. If the message is an authentication message, the critical payment information (e.g. name of payee and payment amount) received in the authentication message is displayed at step 190 such that the operator of the check verification system 24 may compare the displayed payee name and amount to that printed on the face of the secure negotiable instrument to verify that the secure negotiable instrument 32 has not been altered.

Secure Directory Server

Figures 10, 11:
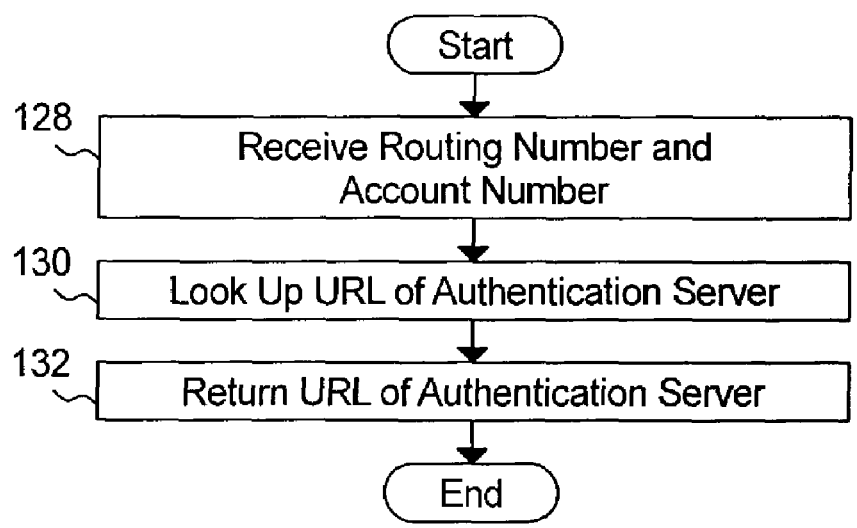
FIG. 10 is a table representing an exemplary database in accordance with one embodiment of the present invention.
FIG. 11 is a flow chart showing exemplary operation of a secure directory server in accordance with one embodiment of the present invention.

To provide the services discussed herein, the secure directory server 22 maintains a database 210 as represented by the table of FIG. 10. Each record 212 if the database 210 is associated with a check issuer or maker of negotiable instruments that operates an authentication server 18 and issues secure negotiable instruments 32. Associated with each check issuers is the routing number in field 214 and account number in field 216 that the maker will print on its secure negotiable instruments 32 in the MICR zone 34 across the bottom edge of the secure negotiable instrument 32. This routing number and account number effectively operates as an identifier of the authentication server 18 that is associated with the maker of the secure negotiable instrument 32. Also associated with each check issuer is the network address or URL of its authentication server in filed 218.

Referring to FIG. 11, operation of the secure directory server 22 is shown. Step 128 represent receiving either identification of the maker of a secure negotiable instrument 32 or a routing number and an account number from a secure negotiable instrument from a check verification system 24. Step 130 represents looking up the network address or URL of the authentication server that associates with the maker of the secure negotiable instrument using the database 210 and step 132 represents providing the URL or the network address to the check verification system 24.

It should be appreciated that the above described systems and methods provide for a secure check 1300 to include an unalterable encrypted representation of critical payment information such as the payee name and the amount on the face. As such, a check verification point of cashing system can be used to display a representation of such critical check information such that a facility providing check cashing services can verify that a payee name, amount, or other critical check information has not been altered prior to presenting the check for cashing.

Although the invention has been shown and described with respect to certain preferred embodiments, it is obvious that equivalents and modifications will occur to others skilled in the art upon the reading and understanding of the specification. For example, for simplistic mapping of ASCII characters to the binary value, each character is mapped to a 6-bit binary value. However, if the limited character set consists 40 or fewer characters (10 numeric, 26 alpha, and 4 or fewer punctuation characters) a more complex mapping algorithm could be used such that each character is represented by fewer than 6-bits. The present invention includes all such equivalents and modifications, and is limited only by the scope of the following claims.

What is claimed is:

1. A system for printing a negotiable instrument in accordance with payment instructions, the payment instructions comprising at least a payee name and a payment amount, the system comprising:

a hash module for calculating:

a compressed number representing the result of operating a compression function on the truncated portion of the payee name and the payment amount, wherein the truncated portion of the payee name consists of a limited character set payee name resulting from mapping each character of a first portion of the payee name to a limited character set; and a numeric sequence, the numeric sequence comprising a hash number representing the result of operating the hash function on a truncated portion of the payee name and the payment amount a payment module for generating an image file, the image file comprising:

a recognizable alpha numeric representation of the payee name within a payee field;

a recognizable numeric representation of the payment amount within a numerical amount field;

a recognizable alpha numeric representation of the payment amount within an alpha numeric amount field;

a MICR representation of a routing number and an account number within a first MICR zone across the bottom of the negotiable instrument;

a MICR representation of the numeric sequence within a second MICR zone across the top of the negotiable instrument, the MICR representation in the second MICR zone being in an inverted relationship to the MICR representation in the first MICR zone;

wherein:

the numeric sequence comprising a hash number representing the result of operating the hash function on a truncated portion of the payee name and the payment amount.

2. The system of claim 1, further comprising:

a printer for printing at least the MICR representation of a routing number and an account number and the MICR representation of the numeric sequence in MICR ink on negotiable instrument stock.

3. A system for printing a negotiable instrument in accordance with payment instructions, the payment instructions comprising at least a payee name and a payment amount, the system comprising:

an encryption module for calculating a numeric sequence, the numeric sequence being an encrypted number comprising the result of operating an encryption function on a compressed representation of a truncated portion of the payee name and the payment amount; and a numeric sequence by operating an encryption function on at least a portion of the payee name and the payment amount;

a payment module for generating an image file, the image file comprising:

a recognizable alpha numeric representation of the payee name within a payee field;

a recognizable numeric representation of the payment amount within a numerical amount field;

a recognizable alpha numeric representation of the payment amount within an alpha numeric amount field;

a MICR representation of a routing number and an account number within a first MICR zone across the bottom of the negotiable instrument;

a MICR representation of the numeric sequence within a second MICR zone across the top of the negotiable instrument, the MICR representation in the second MICR zone being in an inverted relationship to the MICR representation in the first MICR zone.

4. The system of claim 3, wherein:

the truncated portion of the payee name comprises of the result of mapping each character of a portion of the payee name to a limited character set.

5. The system of claim 4, further comprising:

a printer for printing at least the MICR representation of a routing number and an account number and the MICR representation of the numeric sequence in MICR ink on negotiable instrument stock.

6. A system for printing a negotiable instrument in accordance with payment instructions, the payment instructions comprising at least a payee name and a payment amount, the system comprising:

a compression module for calculating the numeric sequence by operating a compression function on at least a portion of the payee name and the payment amount, the numeric sequence comprising a compressed number representing the result of operating the compression function on a truncated portion of the payee name and the payment amount, the truncated portion of the payee name consisting of a limited character set payee name resulting from mapping each character of the truncated portion of the payee name to a limited character set;

a payment module for generating an image file, the image file comprising:

a recognizable alpha numeric representation of the payee name within a payee field;

a recognizable numeric representation of the payment amount within a numerical amount field;

a recognizable alpha numeric representation of the payment amount within an alpha numeric amount field;

a MICR representation of a routing number and an account number within a first MICR zone across the bottom of the negotiable instrument;

a MICR representation of the numeric sequence within a second MICR zone across the top of the negotiable instrument, the MICR representation in the second MICR zone being in an inverted relationship to the MICR representation in the first MICR zone.

7. The system of claim 6, further comprising:

a printer for printing at least the MICR representation of a routing number and an account number and the MICR representation of the numeric sequence in MICR ink on negotiable instrument stock.

8. A method of printing a negotiable instrument, the method comprising:

receiving negotiable instrument printing instructions, the instructions comprising a payee name and a payment amount;

calculating a numeric sequence, using a hash function, the numeric sequence representing the result of operating a hash function on a truncated portion of the payee name and the payment amount, wherein the truncated portion of the payee name consists of a limited character set payee name resulting from mapping each character of a first portion of the payee name to a limited character set;

generating a negotiable instrument image file, the image file comprising:

a recognizable alpha numeric representation of the payee name within a payee field;

a recognizable numeric representation of the payment amount within a numerical amount field;

a recognizable alpha numeric representation of the payment amount within an alpha numeric amount field;

a MICR representation of a routing number and an account number within a first MICR zone across the bottom of the negotiable instrument;

a MICR representation of the numeric sequence within a second MICR zone across the top of the negotiable instrument, the MICR representation in the second MICR zone being in an inverted relationship to the MICR representation in the first MICR zone; and sending a representation of the negotiable instrument image file to a printer that prints at least the MICR representation of a routing number and an account number and the MICR representation of the numeric sequence in MICR ink on negotiable instrument stock.

9. A method of printing a negotiable instrument, the method comprising:

receiving negotiable instrument printing instructions, the instructions comprising a payee name and a payment amount;

calculating a numeric sequence using an encryption function, the numeric sequence representing an encrypted number comprising the result of operating the encryption function on a compressed representation of a truncated portion of the payee name and the payment amount;

generating a negotiable instrument image file, the image file comprising:

a recognizable alpha numeric representation of the payee name within a payee field;

a recognizable numeric representation of the payment amount within a numerical amount field;

a recognizable aloha numeric representation of the payment amount within an alpha numeric amount field;

a MICR representation of a routing number and an account number within a first MICR zone across the bottom of the negotiable instrument;

a MICR representation of the numeric sequence within a second MICR zone across the top of the negotiable instrument, the MICR representation in the second MICR zone being in an inverted relationship to the MICR representation in the first MICR zone; and sending a representation of the negotiable instrument image file to a printer that prints at least the MICR representation of a routing number and an account number and the MICR representation of the numeric sequence in MICR ink on negotiable instrument stock.

10. The method of printing a negotiable instrument of claim 9, where the truncated portion of the payee name comprises of the result of mapping each character of a portion of the payee name to a limited character set.

11. A method of printing a negotiable instrument, the method comprising:

receiving negotiable instrument printing instructions, the instructions comprising a payee name and a payment amount;

calculating a numeric sequence using a compression, the numeric sequence representing a compression number representing the result of operating a compression function on a truncated portion of the payee name and the payment amount, wherein the truncated portion of the payee name consists of a limited character set payee name resulting from mapping each character of the truncated portion of the payee name to a limited character set;

generating a negotiable instrument image file, the image file comprising:
- a recognizable alpha numeric representation of the payee name within a payee field;
- a recognizable numeric representation of the payment amount within a numerical amount field;
- a recognizable alpha numeric representation of the payment amount within an alpha numeric amount field;
- a MICR representation of a routing number and an account number within a first MICR zone across the bottom of the negotiable instrument;
- a MICR representation of the numeric sequence within a second MICR zone across the top of the negotiable instrument, the MICR representation in the second MICR zone being in an inverted relationship to the MICR representation in the first MICR zone; and sending a representation of the negotiable instrument image file to a printer that prints at least the MICR representation of a routing number and an account number and the MICR representation of the numeric sequence in MICR ink on negotiable instrument stock.

* * * * *